United States Patent [19]

Iwatani

(10) Patent No.: US 6,725,295 B2
(45) Date of Patent: Apr. 20, 2004

(54) MULTI-PATH COMPUTER SYSTEM

(75) Inventor: Sawao Iwatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 09/799,945

(22) Filed: Mar. 6, 2001

(65) Prior Publication Data

US 2002/0023151 A1 Feb. 21, 2002

(30) Foreign Application Priority Data

Aug. 18, 2000 (JP) ........................................ 2000-248157

(51) Int. Cl.[7] ................................................. G06F 3/00
(52) U.S. Cl. .............................. 710/38; 710/17; 710/1; 714/4; 714/5; 714/43; 714/48; 714/6
(58) Field of Search ................................. 710/1, 36–51, 710/17; 714/4, 5, 6, 43, 48

(56) References Cited

U.S. PATENT DOCUMENTS

| | | | | |
|---|---|---|---|---|
| 6,044,444 A | * | 3/2000 | Ofek | 711/162 |
| 6,157,962 A | * | 12/2000 | Hodges et al. | 710/1 |
| 6,343,324 B1 | * | 1/2002 | Hubis et al. | 709/229 |
| 6,526,521 B1 | * | 2/2003 | Lim | 714/4 |
| 6,625,747 B1 | * | 9/2003 | Tawil et al. | 714/6 |

FOREIGN PATENT DOCUMENTS

JP          61-68664          4/1986

* cited by examiner

Primary Examiner—Jeffrey Gaffin
Assistant Examiner—Mike Nguyen
(74) Attorney, Agent, or Firm—Greer, Burns & Crain, Ltd.

(57) ABSTRACT

In a multi-path computer system, a host apparatus and devices are connected via a plurality of paths, recorded therein. From channel adapters of the devices, device information of said devices, area information corresponding to a plurality of accessible areas, channel-adapter number information in said devices, and/or component exchange-unit information in said device are obtained. Properness of the plurality of paths is determined from access path information and identification information comprising the device information and area information. Identification information is determined, concerning an error path, comprising the device information and channel-adapter number information, to the other multi-path control parts of its own apparatus or the multi-path control parts of the other apparatuses, when detecting the error path. Operation of a path employing a channel adapter is caused to stop, and, also, identification information is determined, concerning said channel adapter, comprising the device information and component exchange-unit information, to the other multi-path control parts of their own apparatus and/or the multi-path control parts of the other apparatuses, when a request of exchanging said channel adapter is given.

16 Claims, 10 Drawing Sheets

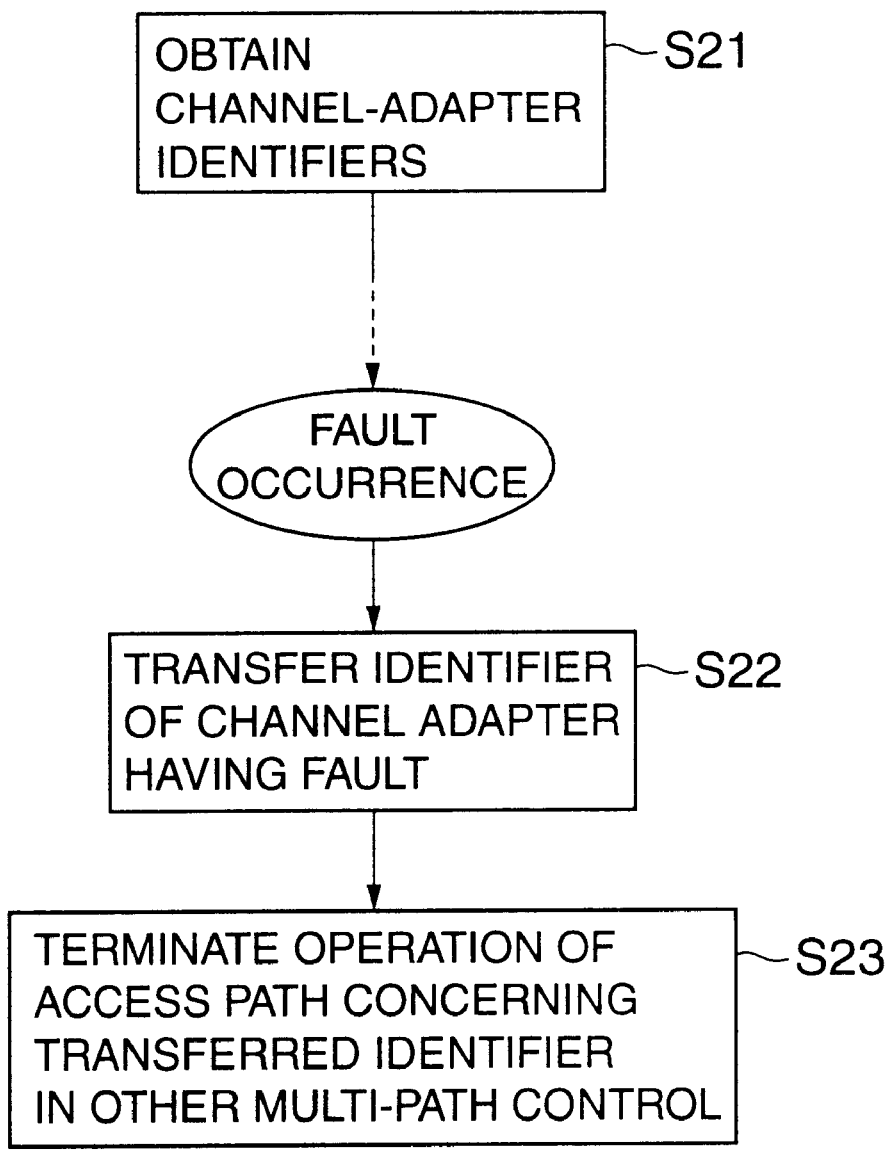

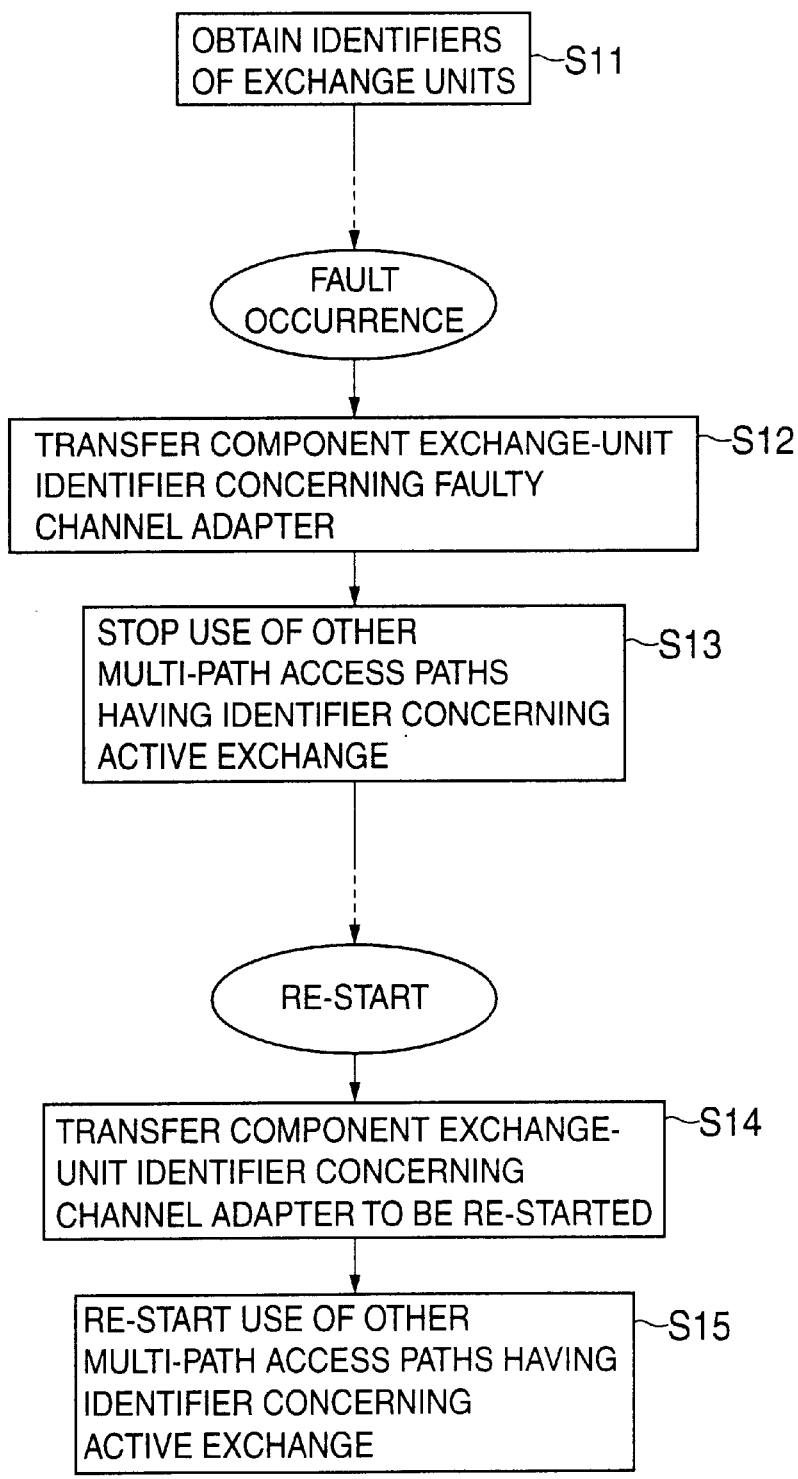

MULTI-PATH COMPUTER SYSTEM

BACKGROUND OF THE INVENTION

1. Field of the Invention

The present invention relates to a system of a connection between servers and devices, to a multi-path computer system by which devices are accessed via multi-path access paths, and, in particular, to a multi-path computer system in which reliability in multi-path device control is secured.

2. Description of the Related Art

Recently, in a case where servers and devices are connected, multi-path device control in which not only a single server and a single device are connected, but also a plurality of servers and a plurality of devices are connected, has been regarded as important, so that reliability is secured.

In the above-mentioned multi-path device control, a user sets a multi-path configuration in order to access devices, and, a multi-path control mechanism apportions access paths based on the above-mentioned multi-path configuration setting.

There are problems as will now be described when the above-mentioned multi-path environment is built:

(1) Data destruction may occur due to an erroneous setting of multi-path configuration.

Because a user makes setting of a multi-path configuration, the setting may be made erroneously. When the erroneous setting is made, different areas may be accessed via two paths, and, thereby, data may be destroyed. Further, there may be a case where, for example, after the access paths are set, an access path is erroneously re-connected while maintenance work is performed. Also in such a case, data may be destroyed.

In particular, recently, Fibre Channel has spread widely, and thereby, it becomes difficult to find out which devices are connected by access paths. Accordingly, multi-path setting may be easily made erroneously.

(2) A method of maintenance performed when a same path is used in common for a plurality of devices has not been clearly established.

For example, when a channel adapter of a device is exchanged, and an access path was set for another device using a channel adapter in a same exchange unit as that of the above-mentioned channel adapter to be exchanged, it is necessary to inform the other device that the channel adapter of this other device will also be exchanged. Otherwise, the other device may not able to render a proper connection. In the related art, a method of dealing with such a situation has not been established clearly. Accordingly, it was not possible to perform maintenance work efficiently.

(3) A long time is required for switching paths, and, thereby, a useless time of dealing with error/fault is required.

For example, when a channel adapter of a device has a fault, a path-fail-over function of a multi-path control mechanism functions, and, thereby, an access path using the channel adapter is prevented from being used. Thereby, when a plurality of access paths were set using this channel adapter, an error dealing-with operation starts each time an access is made via each access path thereof, and path switching is performed. Thus, a useless error dealing-with time is required. Especially, in a case of a Fibre Channel, a long time is required for detecting an error (for example, tens of seconds). Accordingly, for a system employing a Fibre Channel, an efficient channel switching method needs to be developed.

SUMMARY OF THE INVENTION

The present invention has been devised in consideration of the above-discussed situations, and, an object of the present invention is to solve a problem due to an erroneous setting of a multi-path configuration by a user, to shorten a time required for a recovery from a path-fail-over state, and, also, to shorten a time required for maintenance work of a device, in a multi-path computer system.

FIG. 1 shows a general configuration of the present invention.

As shown in FIG. 1, host apparatuses 1 are connected with a plurality of input/output devices 3 via an interface 2. As the interface 2 between the host apparatuses and plurality of input/output devices, the above-mentioned Fibre Channel network system may be used, for example. However, it is also possible to use a SCSI, a hub, or the like for the same purpose. In each host apparatus 1, a plurality of host adapters 1c are provided, and, a plurality of access paths are set for connection between the host adapters 1c and channel adapters 3a of the input/output devices 3.

An I/O request from a host application 1a of the host apparatus 1 is sent to a multi-path control part 1b, which then apportions the I/O to a plurality of access paths. The thus-apportioned I/O is sent to the input/output device 3 via the host adapter 1c, access path and channel adapter 3a, and, then, is processed by the input/output device 3. Then, a response is sent to the host application 1a via the same path.

In this system, the present invention solves the above-mentioned problems as follows:

(1) Each input/output device 3 includes a plurality of areas which the host apparatuses 1 can access; area information corresponding to each of the plurality of areas; device information for identifying this input/output device; and channel adapters 3a, each of which renders permission or inhibition of access from the host apparatuses 1 for each one of the plurality of areas, according to the area information.

Further, each of the host apparatuses 1 includes the plurality of host adapters 1c which are connected to the plurality of paths and perform access to the input/output devices 3; access path information indicating areas of the input/output devices which can be accessed by the respective ones of the plurality of host adapters; and the multi-path control part 1b which selects a specific host adapter 1c according to the access path information when access is made from a software operating in the host apparatus 1, to a specific area of the input/output device 3.

Further, each channel adapter 3a of the input/output devices 3 includes an identification information responding part which responds to the host apparatuses 1 by identification information ① including the device information and area information, and each host apparatus 1 determines from the access path information and identification information ①, whether or not the plurality of paths are proper (or properly set).

Thus, erroneous setting of access paths is prevented from being accepted, by using the identification information ① specifying the area as mentioned above. Accordingly, it is possible to prevent different areas from being accessed via two paths erroneously. Thus, it is possible to prevent data from being destroyed due to an erroneous setting of the access-path configuration.

Further, by obtaining the above-mentioned information from the channel adapters 3a of the input/output devices 3 at a time of turning on of power, and periodically, it is possible to deal with an erroneous connection made also at a time of maintenance work.

(2) Each input/output device 3 includes device information for identifying this input/output device 3, information of a number of each of the channel adapters 3a in the input/output device 3 (adapter number information), and the channel-adapters 3a, each of which renders permission/inhibition of access from the host apparatuses 1 connected with the plurality of paths.

Further, each of the host apparatuses 1 includes the plurality of host adapters 1c connected with the plurality of paths and perform access to the input/output devices 3 therethrough; access path information indicating areas of the input/output devices 3 which can be accessed by the respective ones of the plurality of host adapters; and the multi-path control part 1b which selects a specific host adapter 1c, according to the access path information when access is to be made from a software operating in the host apparatus 1.

Further, each of the channel adapters 3a of the input/output devices 3 includes an identification information responding part which responds to the host apparatuses 1 by identification information ② including the above-mentioned device information and adapter number information, and, when detecting an error path, the host apparatus 1 sends the thus-responded identification information concerning the error path to the other multi-path control parts of their own apparatus and/or the multi-path control parts of the other apparatuses.

Thus, the identification information ② concerning the detected error path is sent to the other multi-path control parts of their own apparatus and/or the multi-path control parts of the other apparatuses. Thereby, the other multi-path control parts of their own apparatus and/or the multi-path control parts of the other apparatuses can terminate operation concerning the relevant access path and perform path-fail-over operation previously. Accordingly, it is possible to prevent a useless error dealing-with time from being required.

(3) Each of the input/output devices 3 includes device information for identifying this input/output device 3; information of component exchange units in this device (component exchange-unit information); and the channel adapters 3a, each of which renders permission/inhibition of access from the host apparatuses 1 connected with the above-mentioned plurality of paths.

Further, each of the host apparatuses 1 includes the plurality of host adapters 1c connected with the above-mentioned plurality of paths and performing access to the input/output devices 3 therethrough; access path information indicating areas of the input/output devices 3 which can be accessed by the respective ones of the plurality of host adapters; and the multi-path control part 1b which selects a specific host adapter 1c, according to the access path information when access is to be made from a software operating in the host apparatus 1.

Further, each of the channel adapters 3a of the input/output devices 3 includes an identification information responding part which responds to the host apparatuses 1 by identification information ③ including the above-mentioned device information and the component exchange-unit information. Then, when a request for exchanging a channel adapter is given, the host apparatus 1 terminates operation of any path using this channel adapter, and, simultaneously, sends the identification information ③ concerning this channel adapter to the other multi-path control parts of their own apparatus and/or the multi-path control parts of the other apparatuses, and, thereby, causes operation concerning the paths using the channel adapters having the same component exchange-unit information to be terminated.

Thus, when a request for exchanging a channel adapter is given, the path using this channel adapter is made to be terminated, and, simultaneously, as the identification information ③ concerning this channel adapter is sent to the other multi-path control parts of their own apparatus and/or the multi-path control parts of the other apparatuses, operation is made to be terminated for the paths using the channel adapters having the same exchange-unit information. Accordingly, it is possible to perform exchange of channel adapters or the like of the input/output devices 3 without adversely affecting the other applications of the own apparatus and/or I/O requests of the other apparatuses.

Further, when re-start is performed after the exchange of components is finished, the same identification information ③ is sent to the other multi-path control parts of their own apparatus and/or the multi-path control parts of the other apparatuses so as to inform them of recovery of the path. Thereby, it is possible to shorten a time required for the recovery after the exchange of components.

In a case where Fibre Channel is used as the interface, it is possible to utilize WWN (World Wide Name) of the Fibre Channel which each channel adapter has, as the above-mentioned identification information specifying/identifying the device. Further, it is also possible to utilize a node name of WWN, as the above-mentioned exchange component-unit information.

Other objects and further features of the present invention will become more apparent from the following detailed description when read in conjunction with the accompanying drawings.

BRIEF DESCRIPTION OF THE DRAWINGS

FIG. 5 is a flow chart showing a process in the above-mentioned second embodiment of the present invention;

FIG. 7 is a flow chart showing an outline of a process in the above-mentioned third embodiment of the present invention;

DETAILED DESCRIPTION OF THE PREFERRED EMBODIMENTS

Figure 1:
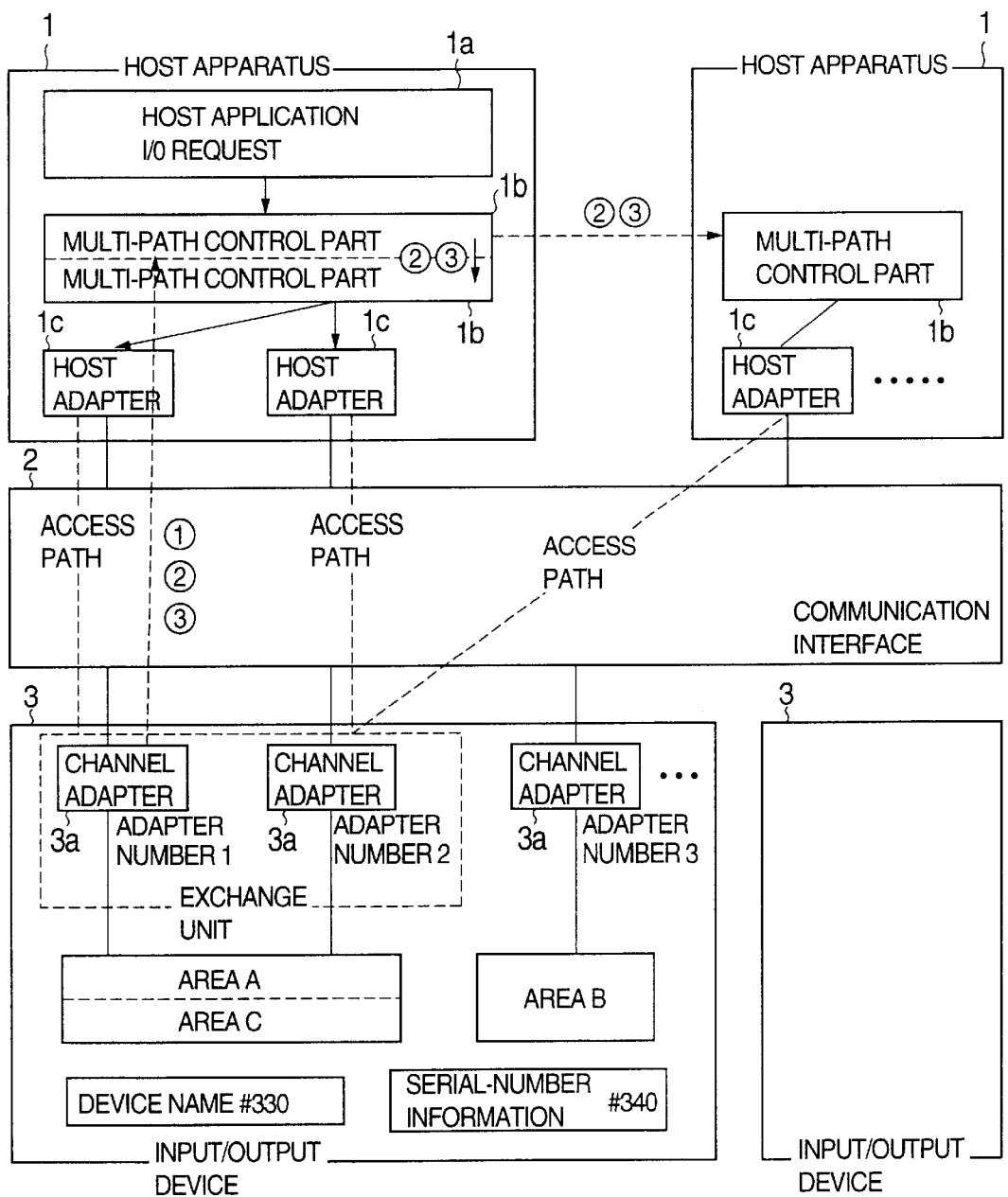
FIG. 1 illustrates an outline of the present invention.
Figure 2:
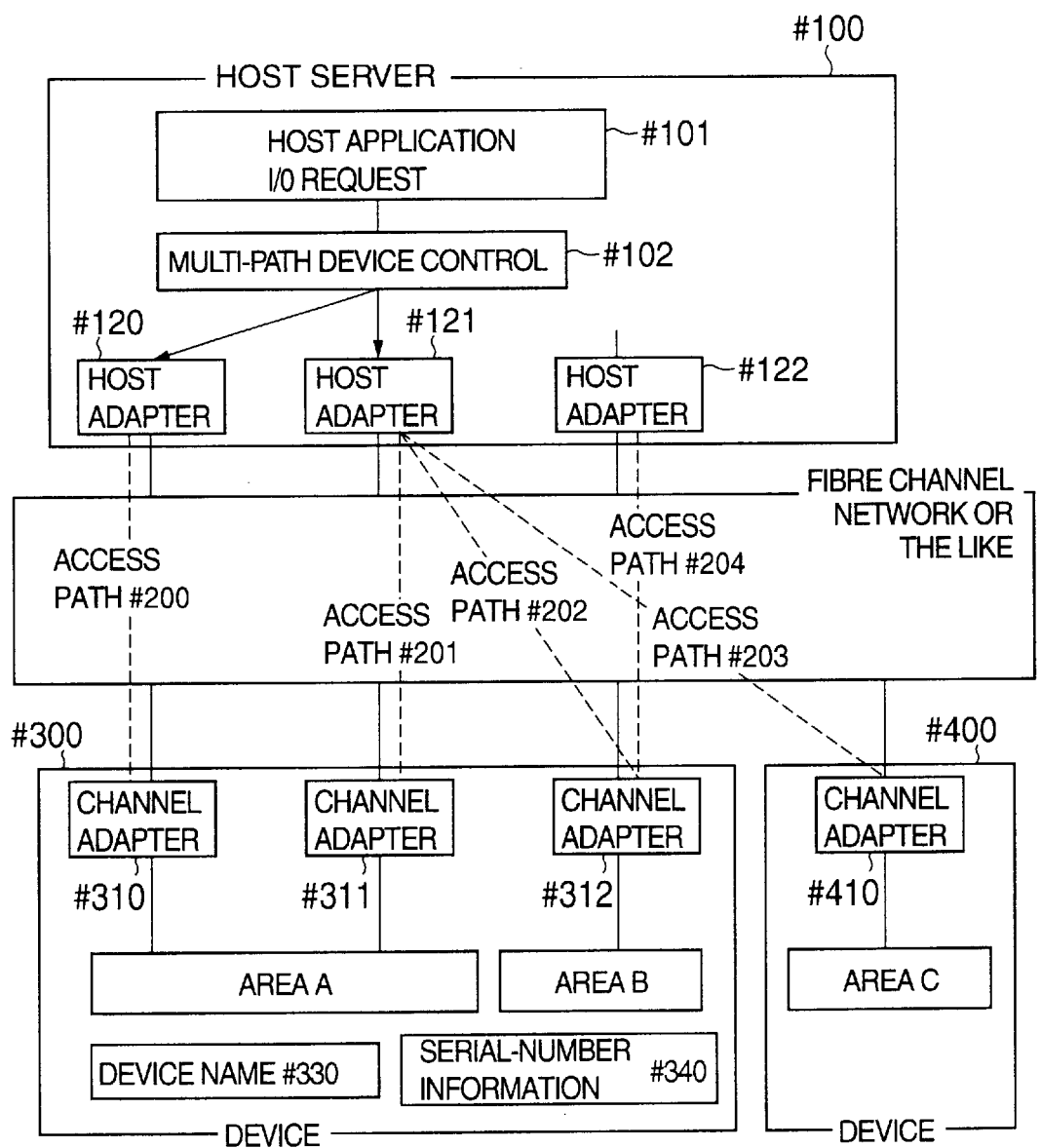
FIG. 2 is a block diagram showing a configuration of a multi-path device control system in each of first, second and third embodiments of the present invention.

FIG. 2 is a block diagram showing a configuration of a multi-path device control system in each of first, second and third embodiments of the present invention. In FIG. 2, a host server #100 corresponding to the above-mentioned host apparatus 1 includes a plurality of host adapters #120, #121, #122, from which a plurality of access paths to a plurality of channel adapters #310, #311, #312, #410 of a plurality of devices #300 and #400 are set. In this system, it is assumed that the access paths #200, #201, #202, #203 and #204 are set.

An interface between the host server #100 and devices #300 and #400 is not particularly prescribed, and, for example, may be of a hub or a SCSI. However, in this system, a Fibre Channel network, which has started spreading widely, is assumed to be used for this purpose. Thereby, a flexible setting of access paths can be rendered.

Respective areas A, B and C of the devices #300 and #400 can be accessed from the channel adapters. In this system, the area A can be accessed from the channel adapters #310 and #311, the area B can be accessed from the channel adapter #312 and the area C can be accessed from the channel adapter #410.

Flow of I/O requests in the system shown in FIG. 2 will now be described.

In the host server #100, a host application #101 operates. An I/O request to the area A is sent to a multi-path device control mechanism #102 from the host application #101. The multi-path device control mechanism #102 apportions the I/O request to either one of the access paths #200 and #201 in order to access the area A.

The thus-apportioned I/O request is sent to the area A via a path of either one of host adapter #120—access path #200—channel adapter #310 or host adapter #121—channel path #201—channel adapter #311, then, is processed, and, then, a response thereto is sent back to the host application #101 via the same path.

How each embodiment of the present invention solves the above-mentioned problems will now be described.

(1) First Embodiment

The first embodiment of the present invention will now be described.

In the system shown in FIG. 2, setting of access paths from the multi-path device control mechanism #102 is originally made by a user to the host server #100 for multi-path device control, generally.

Specifically, in the example shown in FIG. 2, the user should make a setting such that a multi-path device control is configured by using the access paths #200 and #201.

However, when the user erroneously makes a setting such that a multi-path device control is configured by using the access paths #200 and #202, the different areas A and B are accessed via the two paths #200 and #202. Thereby, the area B which is not relevant is damaged.

In order to protect against this erroneous setting, each of the channel adapters has an arrangement incorporated therein such as to send back information of a device name #330 of the device #300, information of a serial number #340 thereof, and information of the area to which the channel adapter is connected in the first embodiment.

The host server #100 reads this information sent back from the channel adapter, and, by combing this information, produces an area name unique in the world, and then uses the thus-produced area name as an identifier.

Specifically, the host server #100 secures the information sent from the channel adapters #310, #311, #312, #410, and produces the following identifiers. In this case, it is assumed that the device name of the device #300 is F6495, the serial number thereof is 0123, the device name of the device #400 is F6495 and the serial number thereof is 0124.

a) The above-mentioned information is secured and sent from the channel adapter #310, and the following identifier is produced for the area A:
F6494-0123-A (b) The above-mentioned information is secured and sent from the channel adapter #311, and the following identifier is produced for the area A:
F6494-0123-A (c) The above-mentioned information is secured and sent from the channel adapter #312, and the following identifier is produced for the area B:
F6494-0123-B (d) The above-mentioned information is secured and sent from the channel adapter #410, and the following identifier is produced for the area C:
F6495-0124-C Then, an arrangement is incorporated in the multi-path device control mechanism #102 such as to reject specification/setting of access paths from which the same identifier cannot be produced, and, thereby, it is possible to prevent an erroneous multi-path device control from being performed.

Thus, in this example, from the channel adapters #310 and #311, the same identifier is produced. Accordingly, a setting of the access paths using them are accepted. However, from the channel adapters #310 and #312, the different identifiers are produced. Accordingly, a setting of the access paths using them are not accepted.

Further, there may be a case where, when a power of the host server #100 is turned off once access paths are set, and, then, the access path #201 is re-connected into the access path #202 during maintenance work, the area B is damaged similarly to the above-mentioned case.

In order to prevent such a problem from occurring, when the host server #100 starts up, the multi-path device control mechanism #102 obtains the identifiers for the respective settings of access paths as mentioned above and determines whether or not the settings of access paths used in multi-path device control are correct.

When the identifiers are different for the respective access paths set for an I/O request under multi-path device control, the multi-path device control mechanism #102 does not perform the relevant multi-path process.

Furthermore, when the access path #201 is erroneously re-connected into the access path #202 while the power is maintained in the ON state in the host server #100, the area B is damaged similarly to the above-mentioned case.

In order to avoid such a situation, the multi-path device control mechanism #102 of the host server #100 periodically requests the channel adapters to send back the respective information, obtains the identifiers for the respective settings access paths similarly to the above-mentioned case, and determines whether the settings of access paths used in multi-path device control are correct.

When the identifiers are different for a setting of access paths used in multi-path device control, the multi-path device control mechanism #102 stops the relevant multi-path process.

Figure 3:
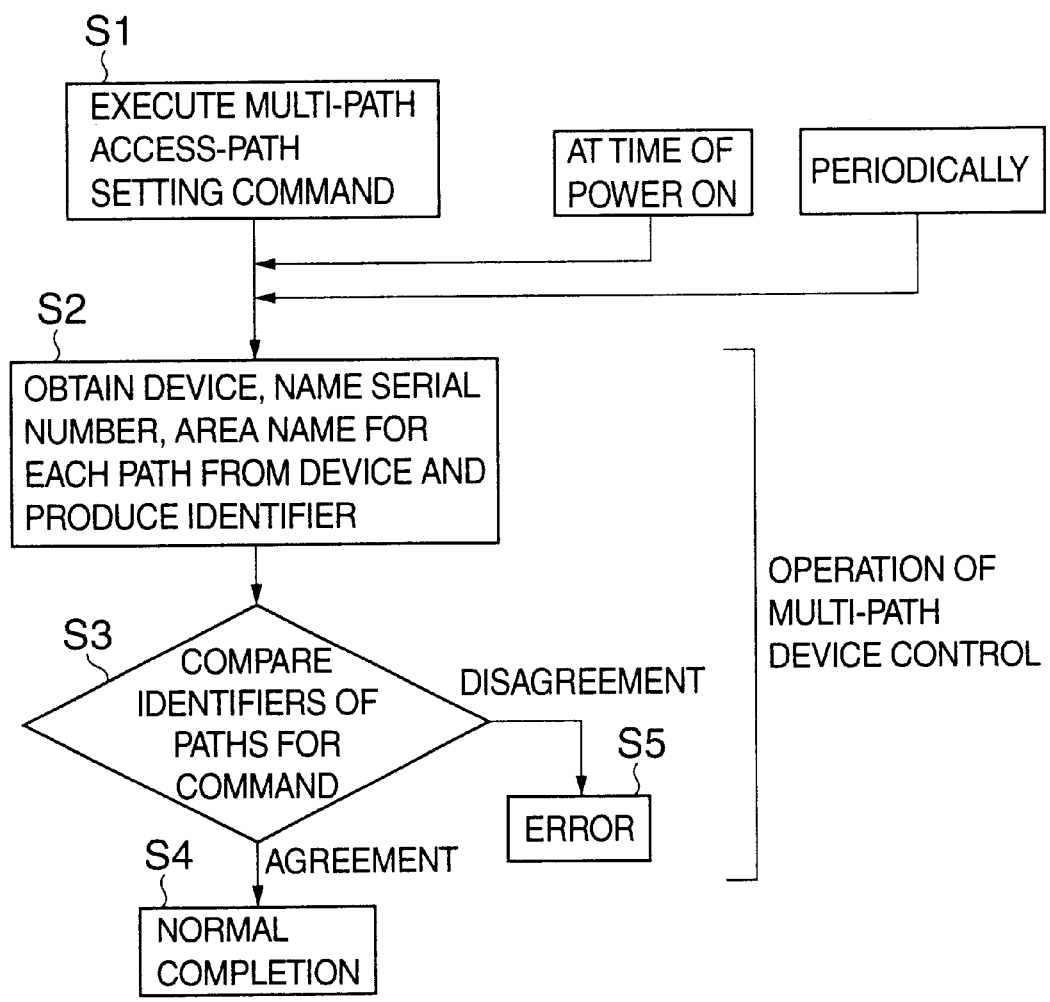
FIG. 3 is a flow chart showing an outline of a process performed in the first embodiment of the present invention.

FIG. 3 is a flow chart showing an outline of a process performed by the multi-path device control mechanism #102 in the first embodiment.

In FIG. 3, first, an access-path setting command input by a user is executed, and a setting of access paths is made in a step S1. Thereby, for example, the access paths #200 and #201, shown in FIG. 2, are set.

Then, the multi-path device control mechanism #102 secures information of a device name, information of a serial number, and area information is sent back from each device, for each path, and produces the above-mentioned identifier therefrom, in a step S2. In the above-mentioned example, the identifier F6494-0123-A is produced for both access paths #200 and #201, F6494-0123-B is produced for the access path #202, F6495-0124-C is produced for the access path #203, and F6494-0123-B is produced for the access path #204.

When an I/O request is given for an area, the multi-path device control mechanism #102 compares the identifiers of paths concerning the command, in a step S3. Then, when the identifiers compared do not coincide, the process is finished as an error in a step S5. When the identifiers coincide with each other, the process is finished normally, and the relevant multi-path process is then executed.

For example, when the user sets the access paths #200 and #201 for a multi-path device control, both identifiers thereof are F6494-0123-A, and thus, coincide. Accordingly, the multi-path device control is then continued. However, when the user erroneously sets the access paths #200 and #202 for the multi-path device control, the identifiers thereof are F6494-0123-A and F6494-0123-B, and thus, do not coincide. Accordingly, the multi-path device control is then interrupted.

Further, either at a time of power being turned on, or periodically, the multi-path device control mechanism #102 also secures, information of device name, information of serial number, and area information sent back from each device, for each path, and produces the identifier therefrom, in the step S2. Then, when an I/O request is given for an area as mentioned above, the multi-path device control mechanism #102 compares the identifiers of paths concerning the command, in the step S3. Thereby, it is possible to also appropriately deal with erroneous re-connection also made at a time of maintenance work.

(2) Second Embodiment

The second embodiment of the present invention will now be described.

Figure 4:
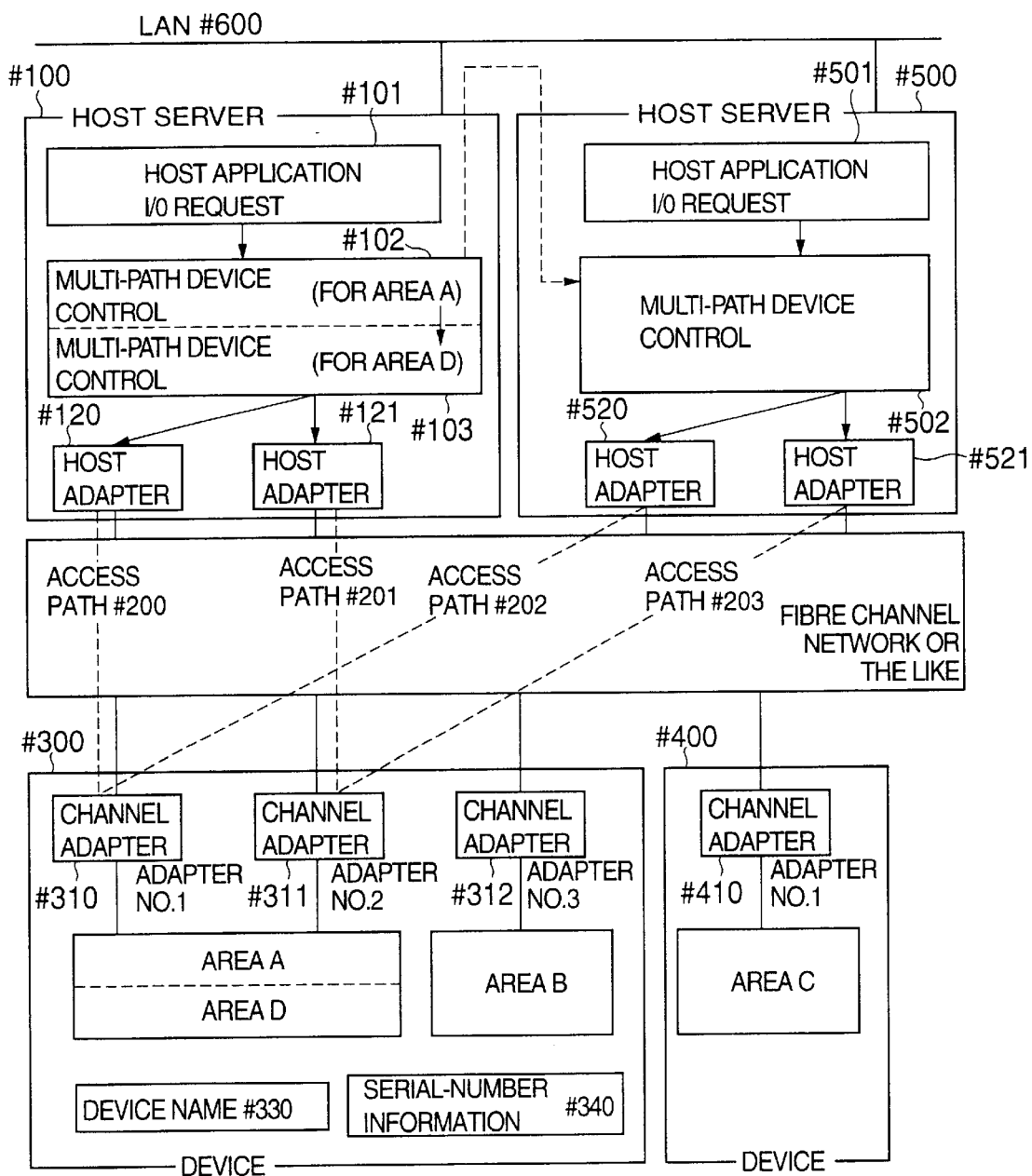
FIG. 4 illustrates the above-mentioned second embodiment of the present invention.

A case is assumed such that, in a system shown in FIG. 4, the following multi-path configurations are set:

In the multi-path device control mechanism (for the area A) #102 in the host server #100, a multi-path configuration using the access paths #200 and #201 to the area A of the device #300 is set.

In a multi-path device control mechanism (for an area D) #103 in the host server #100, a multi-path configuration also using the access paths #200 and #201 to the area D is set.

Then, while a process for the area A is being performed in this state, an error occurs in the channel adapter #310, thereby a path-fail-over function of the multi-path device control mechanism #102 functions, operation concerning the access path #200 is terminated, and, then, instead, the command is issued for the area A by using the channel adapter #311 via the access path #201.

However, if a command is issued for the area D from the host application #101 while the above-mentioned setting of access paths for the area D were maintained in the multi-path device control mechanism #102, also the multi-path device control mechanism (for the area D) #103 would use the channel adapter #310 via the access path #200.

However, the channel adapter #310 is in the error state as mentioned above, and cannot be used. Thus, a useless error dealing-with time would be required for the channel adapter #310. Especially, in the above-mentioned Fibre Channel network, a long time is required for detecting an error. Accordingly, this useless error dealing-with time would become problematic.

In order to avoid such a problematic situation, an arrangement is made such that the channel adapter having the error occurring therein can be recognized by the host server, in the second embodiment.

For this purpose, each channel adapter has an arrangement incorporated therein such that the information of device name #330, or the like of the belonging device, information of serial number #340, or the like, and adapter-number information unique in the device are sent back to the host server thereby.

The host server reads this information sent back from the channel adapters, produces channel-location identifiers each unique in the world by combining the information, and can use it.

Specifically, the host server #100 secures this information sent back from the channel adapters, and generates the following identifiers, for example. In this example, it is assumed that the device name of the device #300 is F6494, the serial number thereof is 0123, the device name of the device #400 is F6495, the serial number thereof is 0124.

(a) The above-mentioned information sent back from the channel adapter #310 (adapter No. 1) is secured, and the following identifier is produced:

F6494-0123-1

(b) The above-mentioned information sent back from the channel adapter #311 (adapter No. 2) is secured, and the following identifier is produced:

F6494-0123-2

(c) The above-mentioned information sent back from the channel adapter #312 (adapter No. 3) is secured, and the following identifier is produced:

F6494-0123-3

(d) The above-mentioned information sent back from the channel adapter #410 (adapter No. 1) is secured, and the following identifier is produced:

F6495-0124-1

This information is secured previously by all the multi-path device control mechanisms for each path (in a step S21 of FIG. 5) before path error is detected.

When detecting a path error, the multi-path device control mechanism informs the above-mentioned channel-location identifier of the channel adapter about the error path to the other multi-path device control mechanisms in the host server (in a step S22).

In this example, the channel-location identifier is informed about the multi-path device control mechanism #103 from the multi-path device control mechanism #102.

The multi-path device control mechanism #103, thus receiving the error identifier, examines whether or not its own settings include any access path concerning the thus-informed identifier. When its own settings include any access path concerning this identifier, the multi-path device control mechanism #103 stops operation concerning this access path, and previously performs a path-fail-over operation (in a step S23). Thereby, it is possible to prevent the multi-path device control mechanism #103 from inadvertently accessing the relevant access path #200.

The above-described process is a process in one host server. However, this process can be performed for more than one host server.

It is assumed that the host server #100 and a host server #500 are connected through a LAN #600, as shown in FIG. 4.

In this system, it is assumed that a multi-path configuration employing the access paths #200 and #201 is set for the area A of the device #300, a multi-path configuration also employing the access paths #200 and #201 is set for the area D of the device #300, and, also, the channel adapter 310 of the device #300 is employed not only by the host server #100 but also by the host server #500.

In this case, a fault of the channel adapter #310 is detected also in the host server #500 similarly. Accordingly, when a fault occurs in the channel adapter #310, error dealing-with operation is performed in the respective host servers #100 and #500. Thereby, a useless (doubled) error dealing-with time is required.

In order to solve this problem, when a fault occurs in the channel adapter #310, for example, the above-mentioned error channel adapter identifier (F6494-0123-1) is also informed by the host server #500 from the multi-path device control mechanism #102 of the host server #100 (in the step S22). Thereby, it is possible to prevent the other host server #500 from inadvertently performing useless error detection, and thereby to shorten a time required for recovery from the fault.

When receiving the above-mentioned error channel adapter identifier, a multi-path device control mechanism #502 of the other host server #500 having started up examines whether or not its own settings include any access paths concerning the same identifier. When any access path concerning the same identifier is included in its own settings, operation concerning this access path is terminated, and a path-fail-over operation is performed previously (in the step S23).

(3) Third Embodiment

The third embodiment of the present invention will now be described.

In the above-described second embodiment, the process is performed when path error is detected. In the third embodiment, which will now be described, active exchange units in a device are considered, and termination of operation of an access path concerning an exchange unit is achieved in a host server.

Figure 6A:
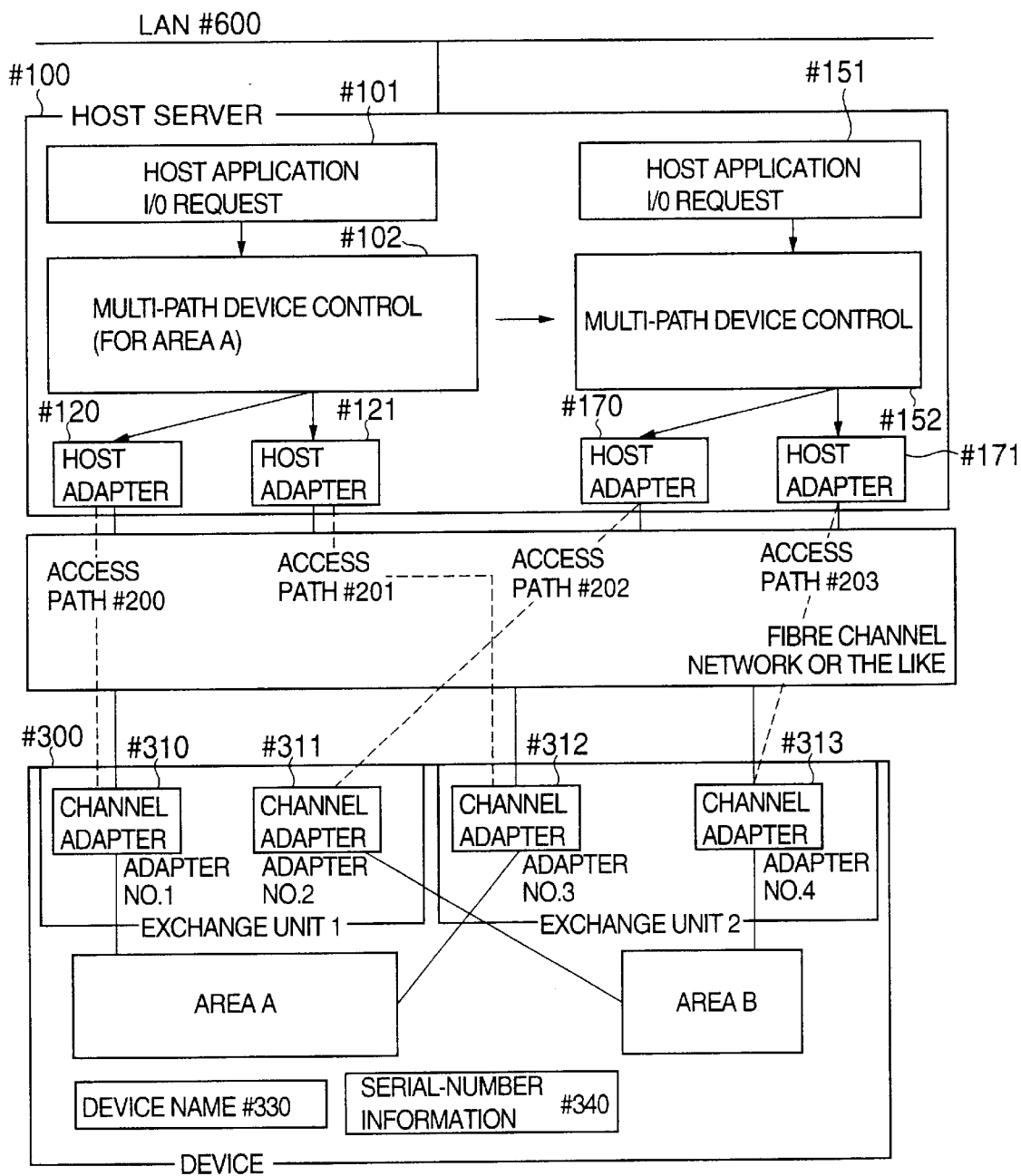
FIG. 6A illustrates the above-mentioned third embodiment of the present invention.

In FIG. 6A, the channel adapters #310 and #311 are of a same package, and, are channel adapters in a same active exchange unit (referred to as an exchange unit 1, hereinafter). Accordingly, when a channel adapter is exchanged, the channel adapters #310 and #311 are exchanged at the same time. Similarly, the channel adapters #312 and #313 are those in a same active exchange unit (referred to as an exchange unit 2, hereinafter).

Further, the multi-path device control mechanism #102 is set so that the area A of the device #300 is accessed via the access paths #200 and #201 from the host server #100.

Further, a multi-path device control mechanism #152 of the same host server #100 is set so that the area B of the device #300 is accessed via the access paths #202 and #203 from the host server #100.

The above-mentioned access paths #200 and #202 use the channel adapters #310 and #311, respectively, in the same exchange unit 1, while the above-mentioned access paths #201 and #203 use the channel adapters #312 and #313 in the same exchange unit 2.

In this environment, when a fault occurs in the channel adapter #310, no influence thereof is given on the paths belonging to the multi-path device control mechanism #152.

However, when the channel adapter #310 is exchanged in order to get rid of the fault of the channel adapter #310, the channel adapter #311 is affected thereby because the channel adapter #311 is in the same package with the channel adapter #310.

In order to solve such a problem, an arrangement is provided such that the operation performed using the channel adapter #311 is previously stopped when the channel adapter #310 is exchanged, in the third embodiment.

Specifically, each channel adapter has an arrangement incorporated therein such that the information of device name #330, for example, of the device, information of serial number #340, for example, and component exchange-unit identifier information unique in the device are sent back to the host server.

The host server reads this information sent back from the channel adapters, produces component exchange-unit identifiers each unique in the world by combining the information, and can use them.

Specifically, the host server #100 secures the information sent back from the channel adapters, and generates the following component exchange-unit identifiers, for example. In this example, it is assumed that the device name of the device #300 is F6494, the serial number thereof is 0123, the device name of the device #400 is F6495, the serial number thereof is 0124.

(a) The above-mentioned information sent back from the channel adapter #310 (in the exchange-unit 1) is secured, and the following identifier is produced:

F6494-0123-1

(b) The above-mentioned information sent back from the channel adapter #311 (in the exchange-unit 1) is secured, and the following identifier is produced:

F6494-0123-1

(c) The above-mentioned information sent back from the channel adapter #312 (in the exchange-unit 2) is secured, and the following identifier is produced:

F6494-0123-2

(d) The above-mentioned information sent back from the channel adapter #313 (in the exchange-unit 2) is secured, and the following identifier is produced:

F6494-0123-2

In FIG. 6A, when the multi-path device control mechanism #102 receives a command of exchanging the channel adapter #310 from a user, the component exchange-unit identifier (in the above-mentioned example, F6494-0123-1) concerning this channel adapter #310 is transferred to the other multi-path device control mechanism #152 in the same host server #100.

When receiving this identifier, the multi-path device control mechanism #152 stops operation concerning the access path #202 concerning the same component identifier, and, thereby, exchange of the channel adapters #310–#311 of the device #300 can be performed without affecting any I/O request from a host application #151.

The above-described process is a process within one host server. However, the same process may be achieved for more than one host server.

A case will now be described with reference to FIG. 6B where active exchange units in a device are considered, and operation concerning an access path is terminated exceeding a host server.

The multi-path device control mechanism #102 is set so that the area A of the device #300 is accessed via the access paths #200 and #201 from the host server #100. Further, a multi-path device control mechanism #502 of the host server #500 is set so that the area B of the device #300 is accessed via the access paths #202 and #203 from the host server #500. The component exchange-unit identifiers are the same as those described above with reference to FIG. 6A.

Figure 6B:
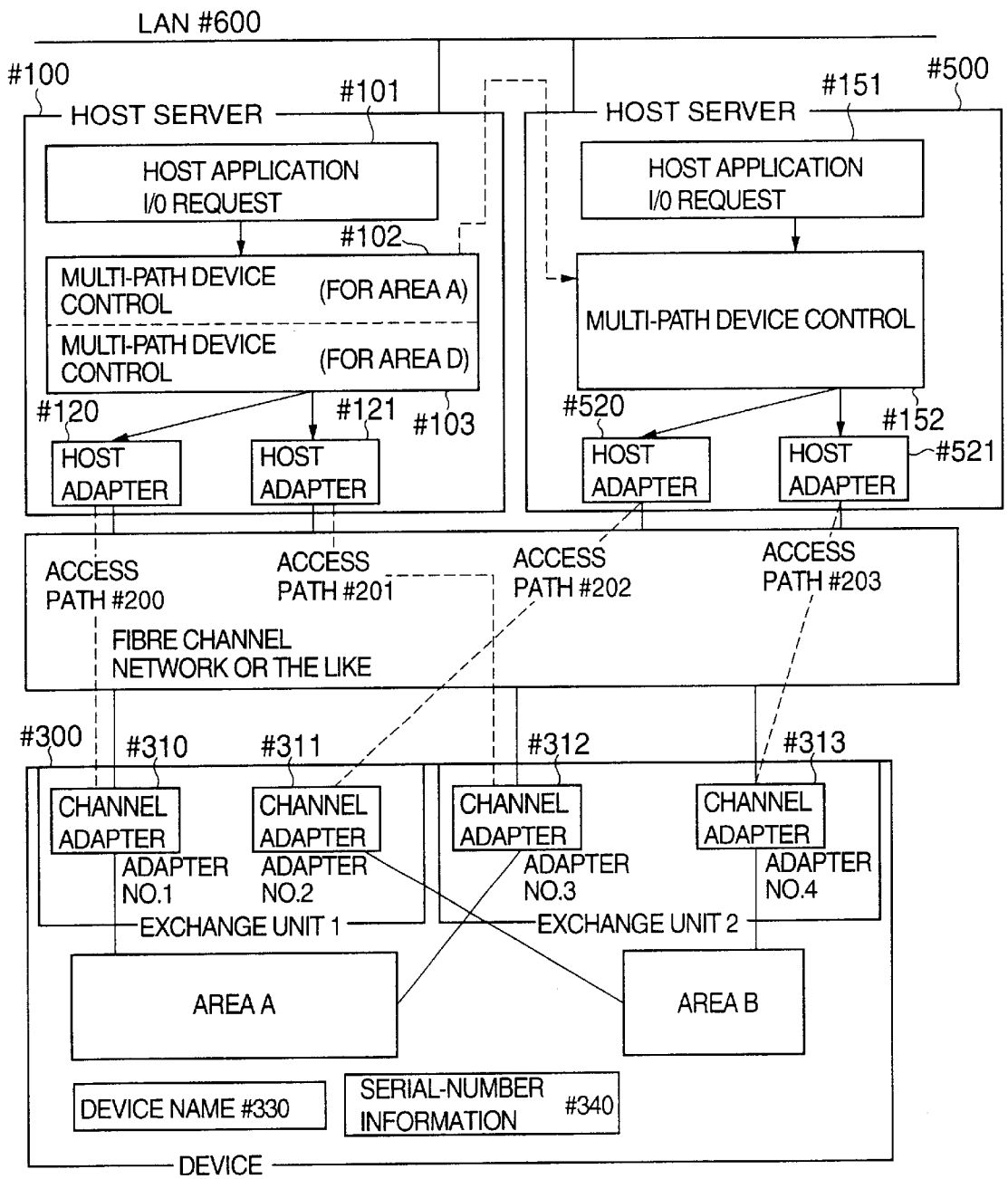
FIG. 6B illustrates another aspect of the third embodiment of the present invention.

In FIG. 6B, when the multi-path device control mechanism #102 receives a command of exchanging the channel adapter #310 from a user, the component exchange-unit identifier (in the above-mentioned example, F6494-0123-1)

concerning this channel adapter #310 is transferred to the multi-path device control mechanism #502 of the other host server #500.

When receiving this identifier, the multi-path device control mechanism #502 terminates operation concerning the access path #202 concerning the same component identifier, and, thereby, exchange of the channel adapters #310–#311 in the same exchange unit of the device #300 can be performed without affecting any I/O request from the host application #501.

Further, it is also possible to consider above-mentioned active exchange units in a device, and to re-start operation concerning the relevant access paths in the host server.

Specifically, in FIG. 6A, when the channel adapters #310–#311 in the same exchange unit are exchanged, operation concerning the relevant access paths #200 and #202 are terminated by the multi-path device control mechanisms #102 and #152.

Then, after the exchange is normally completed, a user may issue a command of re-starting operation concerning the relevant access path to the multi-path device control mechanism #102.

Thereby, the multi-path device control mechanism #102 re-starts operation concerning the access path #200. Simultaneously, the exchange-unit identifier (F6494-0123-1) concerning this access path #200 is informed of to the other multi-path device control mechanism #152 in the same host server #100 so that it is informed thereto that the path has been recovered. When receiving this information, the multi-path device control mechanism #152 issues, to itself, a command of re-starting operation concerning the access path #202 concerning the same exchange-unit identifier when operation concerning this access path was terminated. Thereby, re-starting of operation concerning the access path #202 is also rendered automatically.

Similarly, it is also possible to consider active exchange units of a device, and to re-start operation concerning an access path exceeding a host server.

Specifically, in FIG. 6B, when the channel adapters #310–#311 of the device #300 are exchanged, operation concerning the access paths #200 and #202 are terminated by the multi-path device control mechanisms #102 and #152.

Then, after the exchange is normally completed, a user issues a command of re-starting operation concerning the access path to the multi-path device control mechanism #102.

Thereby, the multi-path device control mechanism #102 re-starts operation concerning the access path #200. Simultaneously, the exchange-unit identifier (F6494-0123-1) concerning this access path #200 is informed of the multi-path device control mechanism #152 of the other host server #500 so that it is informed thereto that the path has been recovered. When receiving this information, the multi-path device control mechanism #152 issues, to itself, a command of re-starting operation concerning the access path #202 concerning the same exchange-unit identifier when operation concerning this access path was terminated. Thereby, re-starting of operation concerning the access path #202 is also rendered.

Thereby, it is possible to simplify a command for multi-path device control when an active exchange unit is exchanged, exceeding a host server, to prevent an erroneous operation from being performed onto the multi-path device control, and to shorten a time required for recovery from termination due to exchange.

FIG. 7 is a flow chart showing an outline of the above-described third embodiment of the present invention.

In FIG. 7, first, the host server obtains the device name, serial number and information of component exchange units in the device from each channel adapter, and produces the above-mentioned component exchange-unit identifier therefrom, in a step S11.

Then, when a fault occurs in a channel adapter, the multi-path device control mechanism transfers the component exchange-unit identifier concerning the channel adapter to the other multi-path device control mechanisms of the own host server and/or of the other host servers, in a step S12.

The other multi-path device control mechanism receiving this identifier causes any access via the access paths concerning this component exchange-unit identifier to terminate, in a step S13.

Then, when an access re-starting command is issued, the multi-path device control mechanism transfers the component exchange-unit identifier of the relevant channel adapter to the other multi-path device control mechanisms of the own host server and/or the other host servers so as to inform thereto that the access path has been recovered, in a step S14, and re-starts access via the concerning access paths, in a step S15.

In the above-discussed embodiments, the serial numbers are used in the identifiers specifying the devices. However, when Fibre Channel network is used, instead of the serial numbers, WWN (World Wide Names) of the Fibre Channel which each channel adapters possesses may be used.

WWN of Fibre Channel is unique in the world. Accordingly, there is no problem in use thereof in each identifier in each of the above-discussed embodiments of the present invention. However, it is noted that WWN is used only in Fibre Channel connection environments. Especially, WWN is useful in a case where the serial number of a device cannot be read out.

Figure 8:
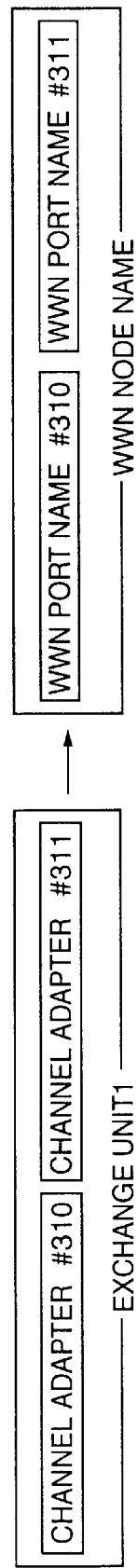
FIG. 8 illustrates a relationship between a component exchange-unit and a node name of WWN which may be used in the above-mentioned third embodiment of the present invention.

As in each identifier in the above-mentioned third embodiment of the present invention, a node name of WWN may be utilized. The node name of WWN is unique in the world. Also, it is possible to utilize a plurality of port names given in a same node name, as shown in FIG. 8. Accordingly, it is possible to utilize them in identifiers specifying exchange components.

Although the first, second and third embodiments have been described separately, each thereof may be used alone, or all or some of the first, second and third embodiments may be combined in any manner.

Figure 9:
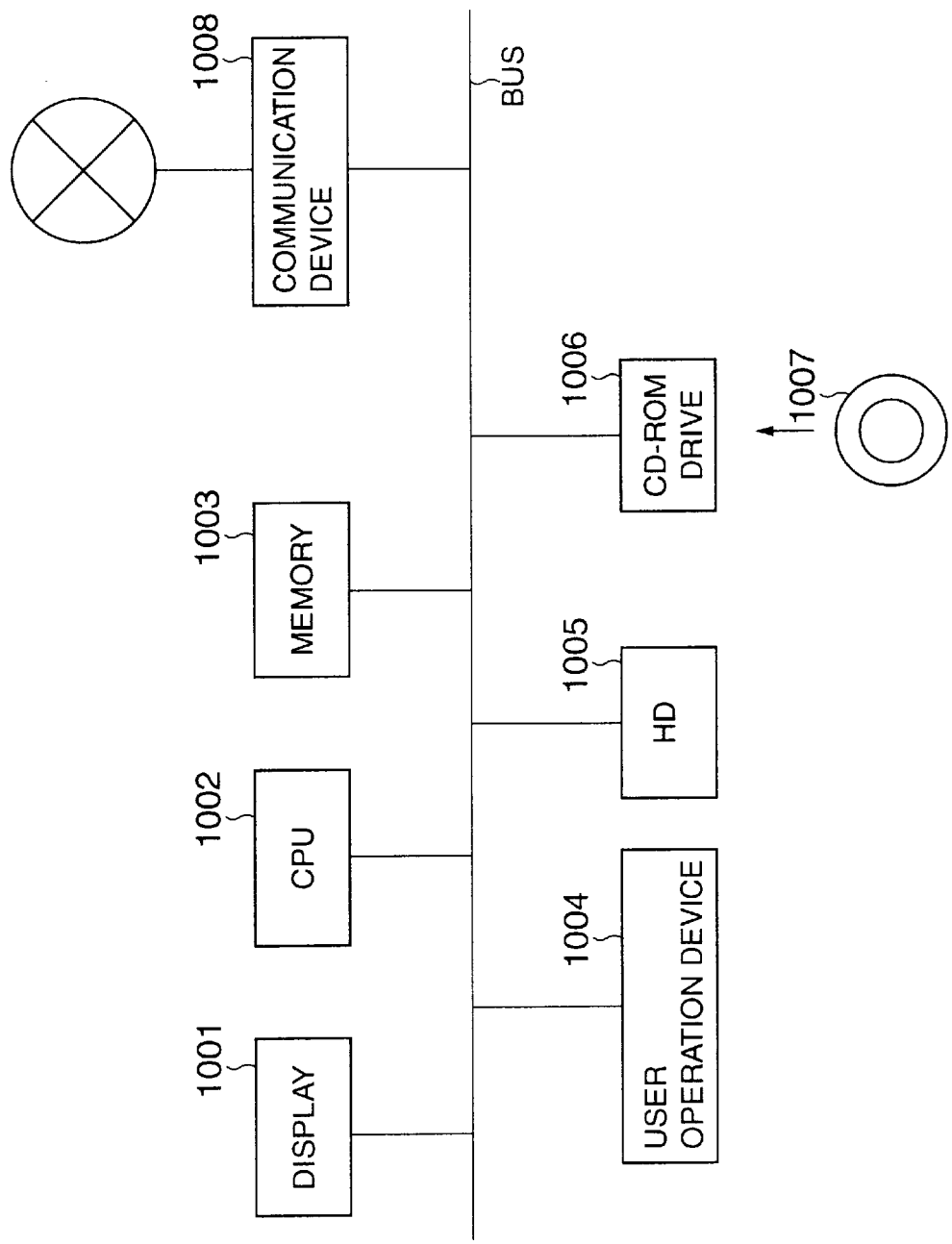
FIG. 9 is a block diagram showing a configuration of a computer which may be used as the host apparatus in each of the above-mentioned first, second and third embodiments of the present invention.

FIG. 9 is a block diagram showing a configuration of a computer which may be used as any host server in any of the above-discussed first, second and third embodiments of the present invention.

The computer shown in FIG. 9 includes a display device 1001 (such as a CRT, a liquid crystal display device or the like), a CPU 1002, a memory 1003 (such as a RAM, a ROM and so forth), a user operation (user input) device 1004 (such as a mouse, keyboard and so forth), a hard disk drive 1005, a CD-ROM drive 1006, and a communication device 1008 for connecting the computer to a network such as Fibre Channel network.

A software program for causing the computer to perform the processes described above with reference FIGS. 2 through 8 (especially, FIGS. 3, 5 and 7) described as being executed by each multi-path device control mechanism is previously recorded in a CD-ROM 1007.

Then, when the CD-ROM 1007 is inserted into and driven by the CD-ROM driver 1006, the program is read therefrom, and then, is stored in the hard disk drive 1005.

Then, the CPU 1002 reads the program, and executes instructions thereof in cooperation with the memory 1003, in response to commands input by a user via the user operation device 1004. Thus, the computer shown in FIG. 9 performs the above-described process of host server/apparatus of multi-path device control system according to the present invention.

The present invention is not limited to the above-described embodiments, and variations and modifications may be made without departing from the scope of the present invention.

The present application is based on Japanese priority application No. 2000-248157, filed on Aug. 18, 2000, the entire contents of which are hereby incorporated by reference.

What is claimed is:

1. A multi-path computer system in which at least one host apparatus and at least one device are connected via a plurality of paths, said device comprising a plurality of areas accessible by said host apparatus; area information for said plurality of areas, respectively; device information for identifying said device; and a channel adapter which is connected with said plurality of paths, and permits/inhibits, for each area, access from the host apparatus, according to the area information;

the host apparatus comprising a plurality of host adapters connected with said plurality of paths and performing the access to said device; access path information indicating areas of the device accessible from each of said plurality of host adapters; and a multi-path device control part selecting a specific host adapter according to the access path information at a time of access to a specific area of the device; and said channel adapter responding to the host apparatus by identification information comprising the device information and area information; and said host apparatus examining properness of said plurality of paths, using the access path information and identification information.

2. An apparatus connected with input/output devices having a plurality of access areas, by a plurality of paths, comprising:

a plurality of host adapters connected with said plurality of paths and performing access to the input/output devices;

access path information indicating areas of the input/output devices accessible by each of said plurality of host adapters;

a multi-path control part selecting a specific host adapter, according to the access path information, when access is made by a software operating in said apparatus to a specific area of the input/output devices; and a path determining part determining properness of said plurality of paths, by using identification information comprising device information and area information responded by said input/output devices, and the access path information.

3. An input/output device connected with at least one host apparatus via a plurality of paths, comprising:

a plurality of areas to which access can be made from the host apparatus;

area information corresponding to said plurality of areas, respectively;

device information for identifying said input/output device;

a channel adapter which is connected with said plurality of paths, and permits or inhibits, for each area, access from the host apparatus, according to the area information; and an identification information responding part responding to the host apparatus by identification information comprising the device information and area information.

4. A multi-path computer system in which at least one host apparatus and at least one device are connected via a plurality of paths, the device comprising device information for identifying said device, channel-adapter number information unique in said device, and a channel adapter connected with said plurality of paths, and permitting/inhibiting access from the host apparatus;

the host apparatus comprising a plurality of host adapters connected with said plurality of paths and performing the access to the device; access path information indicating areas of the device accessible from each of said plurality of host adapters; and a multi-path device control part selecting a specific host adapter according to the access path information at a time of access to a specific area of the device; and said channel adapter responding to the host apparatus by identification information comprising the device information and channel-adapter number information; and said host apparatus providing the identification information concerning an error path to the other multi-path control parts of their own apparatus or the multi-path control parts of the other apparatuses, when detecting the error path.

5. An apparatus connected with devices via a plurality of paths, comprising:

a plurality of host adapters connected with said plurality of paths and performing the access to the devices;

access path information indicating areas of the devices accessible from each of said plurality of host adapters;

a multi-path control part selecting a specific host adapter according to the access path information at a time of access to a specific area of a device; and a part informing of identification information, concerning an error path, comprising device information and channel-adapter number information of a device responded from said device, to the other multi-path control parts of their own apparatus or the multi-path control parts of the other apparatuses, when detecting the error path.

6. A device connected with at least one host apparatus via a plurality of paths, comprising:

device information for identifying said device;

channel-adapter number information unique in said device;

a channel adapter connected with said plurality of paths, and permitting/inhibiting access from the host apparatus; and an identification information responding part responding to the host apparatus by identification information comprising the device information and channel-adapter number information.

7. A multi-path computer system in which at least one host apparatus and at least one device are connected via a plurality of paths, the device comprising device information for identifying said device, component exchange-unit information for said device, and a channel adapter connected with said plurality of paths, and permitting/inhibiting access from the host apparatus;

said host apparatus comprising a plurality of host adapters connected with said plurality of paths and performing the access to the device; access path information indicating areas of the device accessible from each of said plurality of host adapters; and a multi-path device control part selecting a specific host adapter according to the access path information at a time of access to a specific area of the device; and said channel adapter responding to the host apparatus by identification information comprising the device information and component exchange-unit information; and said host apparatus terminating operation concerning a path employing a channel adapter, and, also, providing the identification information concerning said channel adapter to the other multi-path control parts of their own apparatus and/or the multi-path control parts of the other apparatuses, when a request of exchanging said channel adapter is given.

8. An apparatus connected with devices via a plurality of paths, comprising:

a plurality of host adapters connected with said plurality of paths and performing the access to the devices;

access path information indicating areas of the devices accessible from each of said plurality of host adapters;

a multi-path control part selecting a specific host adapter according to the access path information at a time of access to a specific area of a device; and a part terminating operation concerning a path employing a channel adapter, and, also, providing the identification information, concerning said channel adapter, comprising device information and component exchange-unit information responded from the device, to the other multi-path control parts of their own apparatus and/or the multi-path control parts of the other apparatuses, when a request of exchanging said channel adapter is given.

9. A device connected with at least one host apparatus via a plurality of paths, comprising:

device information for identifying said device;

component exchange-unit information for said device;

a channel adapter connected with said plurality of paths, and permitting/inhibiting access from the host apparatus; and an identification information responding part responding to the host apparatus by identification information comprising the device information and component exchange-unit information.

10. A computer readable recording medium, having a program for a computer to perform a process of a host apparatus of a multi-path computer system in which at least one host apparatus and at least one device are connected via a plurality of paths, recorded therein, said program comprising:

first program code means for obtaining, from a channel adapter of the device, device information of said device, area information corresponding to a plurality of accessible areas of said device, channel-adapter number information for said device, and/or component exchange-unit information for said device;

second program code means for determining properness of the plurality of paths, from access path information and identification information comprising the device information and area information;

third program code means for providing identification information, concerning an error path, comprising the device information and channel-adapter number information, to the other multi-path control parts of their own apparatus or the multi-path control parts of the other apparatuses, when detecting the error path; and fourth program code means for terminating operation concerning a path employing a channel adapter, and, also, providing identification information, concerning said channel adapter, comprising the device information and component exchange-unit information, to the other multi-path control parts of their own apparatus and/or the multi-path control parts of the other apparatuses, when a request of exchanging said channel adapter is given.

11. The system as claimed in claim 1, wherein:

said host apparatus determines the properness of the plurality of paths at a time of starting up; and does not accept a multi-path setting when the identification information different therebetween is obtained for the multi-path setting.

12. The system as claimed in claim 1, wherein:

said host apparatus determines the properness of the plurality of paths periodically; and does not accept a multi-path setting when the identification information different therebetween is obtained for the multi-path setting.

13. The system as claimed in claim 1, wherein, as information for identifying the device, a World Wide Name of a Fibre Channel which the channel adapter possesses is utilized.

14. The system as claimed in claim 4, wherein, as information for identifying the device, a World Wide Name of a Fibre Channel which the channel adapter possesses is utilized.

15. The system as claimed in claim 7, wherein, when a request of exchanging a channel adapter and performing re-restart operation is given, operation concerning a path employing said channel adapter is re-started, the identification information concerning said channel adapter is informed of the other multi-path control parts of their own apparatus and/or the multi-path control parts of the other apparatuses, and operation concerning the paths employing the channel adapters having the same exchange-unit identifier is caused to re-start.

16. The system as claimed in claim 7, wherein, as information for identifying the device, a World Wide Name of a Fibre Channel which the channel adapter possesses is utilized.

* * * * *